(12) United States Patent
Ling et al.

(10) Patent No.: US 9,912,466 B2
(45) Date of Patent: *Mar. 6, 2018

(54) METHOD AND SYSTEM FOR A LOW-POWER CLIENT IN A WIDE AREA NETWORK

(71) Applicant: Maxlinear, Inc., Carlsbad, CA (US)

(72) Inventors: Curtis Ling, Carlsbad, CA (US); Timothy Gallagher, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,674

(22) Filed: Aug. 23, 2016

(65) Prior Publication Data

US 2016/0365968 A1 Dec. 15, 2016

Related U.S. Application Data

(60) Continuation of application No. 13/866,205, filed on Apr. 19, 2013, now Pat. No. 9,426,734, which is a division of application No. 13/553,175, filed on Jul. 19, 2012, now Pat. No. 8,711,750.

(60) Provisional application No. 61/547,663, filed on Oct. 4, 2011, provisional application No. 61/555,550, filed
(Continued)

(51) Int. Cl.
*G06F 1/32* (2006.01)
*H04L 7/00* (2006.01)
*H04W 52/02* (2009.01)
*H04L 12/28* (2006.01)

(52) U.S. Cl.
CPC .......... *H04L 7/0033* (2013.01); *G06F 1/3209* (2013.01); *G06F 1/3234* (2013.01); *G06F 1/3278* (2013.01); *H04L 12/2801* (2013.01); *H04W 52/02* (2013.01); *Y02B 60/126* (2013.01); *Y02B 60/32* (2013.01); *Y02B 60/50* (2013.01)

(58) Field of Classification Search
CPC .... G06F 1/3209; G06F 1/3234; G06F 1/3278; H04L 12/2801; H04L 7/0033; H04W 52/02; Y02B 60/126; Y02B 60/32; Y02B 60/50

See application file for complete search history.

(56) References Cited

U.S. PATENT DOCUMENTS 6,698,022 B1 * 2/2004 Wu ...................... H04J 3/0655
370/443
7,089,580 B1 8/2006 Vogel et al.
7,194,288 B2 3/2007 Lee et al.
(Continued)

*Primary Examiner* — Thomas Lee
*Assistant Examiner* — Chad Erdman
(74) *Attorney, Agent, or Firm* — McAndrews, Held & Malloy

(57) ABSTRACT

A network device may be operable to receive an indication from a cable modem termination system (CMTS) that media access control (MAC) management messages will be transmitted by the CMTS at fixed intervals. Subsequent to receiving the indication, the network device may be operable to power down one or more components of the network device and set a sleep timer to a value equal to an integer multiple of the fixed interval minus a transition period. The network device may power up the one or more components of the network device upon expiration of the sleep timer. The network device may power up the one or more components of the network device upon an amount of traffic in a buffer of the network device reaching a threshold.

16 Claims, 11 Drawing Sheets

Related U.S. Application Data on Nov. 4, 2011, provisional application No. 61/569,346, filed on Dec. 12, 2011.

(56) References Cited

U.S. PATENT DOCUMENTS

| | | | |
|---|---|---|---|
| 7,246,368 B1* | 7/2007 | Millet | H04L 12/2697 370/241 |
| 7,278,039 B1 | 10/2007 | Lo | |
| 7,389,528 B1* | 6/2008 | Beser | H04L 12/12 455/557 |
| 7,420,986 B1* | 9/2008 | Howard | H04L 12/2801 370/222 |
| 7,551,592 B2 | 6/2009 | Van Kampen et al. | |
| 7,587,746 B1* | 9/2009 | Schwartzman | H04L 5/14 370/230 |
| 7,603,574 B1 | 10/2009 | Gyugyi et al. | |
| 7,930,000 B2 | 4/2011 | Quigley | |
| 2002/0186803 A1* | 12/2002 | Kolze | H04B 1/7103 375/358 |
| 2004/0136396 A1* | 7/2004 | Yonge, III | H04B 3/542 370/445 |
| 2004/0181800 A1 | 9/2004 | Rakib et al. | |
| 2004/0240383 A1 | 12/2004 | Davolos | |
| 2004/0264396 A1 | 12/2004 | Ginzburg et al. | |
| 2005/0025145 A1 | 2/2005 | Rakib et al. | |
| 2005/0048960 A1 | 3/2005 | Yamachi | |
| 2005/0049013 A1 | 3/2005 | Chang et al. | |
| 2006/0126660 A1 | 6/2006 | Denney et al. | |
| 2007/0195824 A9 | 8/2007 | Chapman | |
| 2008/0018427 A1 | 1/2008 | Ezra et al. | |
| 2009/0034415 A1 | 2/2009 | Barr | |
| 2009/0132823 A1 | 5/2009 | Grimen et al. | |
| 2009/0141901 A1 | 6/2009 | You et al. | |
| 2009/0144766 A1 | 6/2009 | Jung et al. | |
| 2009/0325533 A1 | 12/2009 | Lele et al. | |
| 2010/0062725 A1 | 3/2010 | Ryu | |
| 2010/0159959 A1* | 6/2010 | Santhanam | H04W 52/02 455/458 |
| 2010/0226297 A1 | 9/2010 | Kasslin et al. | |
| 2011/0172000 A1 | 7/2011 | Quigley et al. | |
| 2011/0264818 A1 | 10/2011 | Riggert et al. | |
| 2012/0089851 A1 | 4/2012 | Ting et al. | |
| 2015/0046609 A1 | 2/2015 | Gallagher et al. | |

* cited by examiner

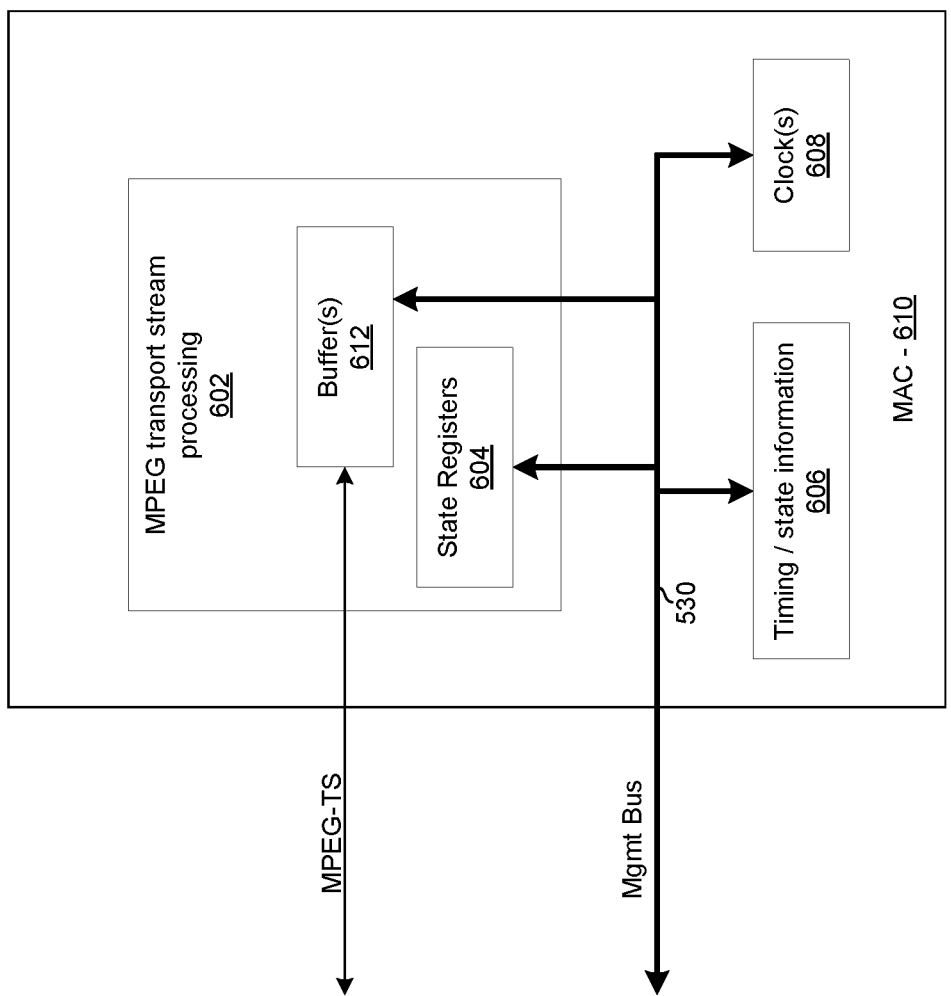

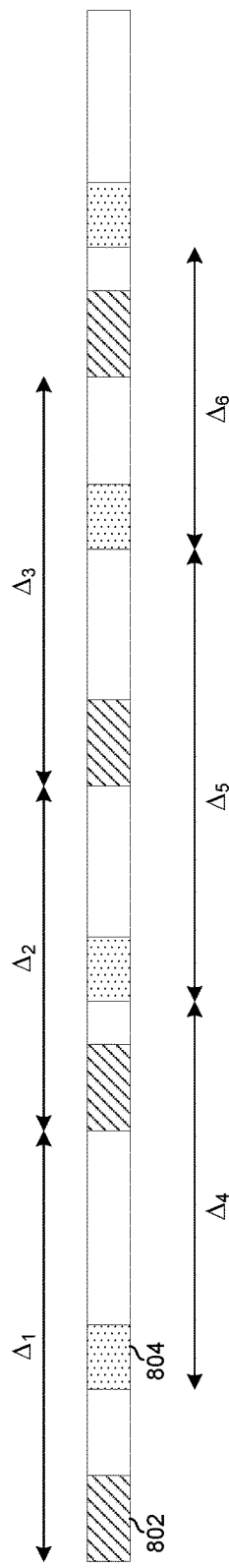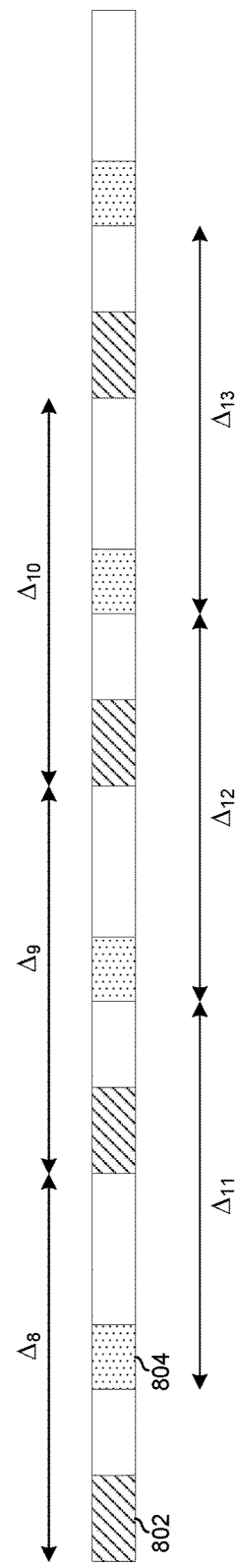

METHOD AND SYSTEM FOR A LOW-POWER CLIENT IN A WIDE AREA NETWORK

CLAIM OF PRIORITY

This patent application is a continuation of U.S. patent application Ser. No. 13/866,205 filed on Apr. 19, 2013, which is a divisional of U.S. patent application Ser. No. 13/553,175 filed in response to a restriction/election requirement. U.S. patent application Ser. No. 13/553,175, in turn, makes reference to, claims priority to and claims benefit from U.S. Provisional Patent Application Ser. No. 61/547,663 filed on Oct. 14, 2011; U.S. Provisional Patent Application Ser. No. 61/555,550 filed on Nov. 4, 2011; and U.S. Provisional Patent Application Ser. No. 61/569,346 filed on Dec. 12, 2011.

Each of the above applications is hereby incorporated herein by reference in its entirety.

FIELD OF THE INVENTION

Certain embodiments of the invention relate to networking. More specifically, certain embodiments of the invention relate to a method and system for a low-power client in a wide area network.

INCORPORATION BY REFERENCE

This patent application also makes reference to:
U.S. patent application Ser. No. 13/485,034 entitled "Method and System for Server-Side Message Handling in a Low-Power Wide Area Network," and filed on May 31, 2012;
U.S. patent application Ser. No. 13/553,328 entitled "Method and System for Client-Side Message Handling in a Low-Power Wide Area Network," and filed on Jul. 19, 2012; and
U.S. patent application Ser. No. 13/553,195 entitled "Method and System for Server-Side Handling of a Low-Power Client in a Wide Area Network," and filed on Jul. 19, 2012;

Each of the above applications is hereby incorporated herein by reference in its entirety.

BACKGROUND OF THE INVENTION

Existing wide area networks consume too much power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An system and/or method is provided for a Low-Power Client in a Wide Area Network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIG. 6 illustrates a media access controller of an exemplary CPE.

FIGS. 8A and 8B illustrate activity on a network channel before and during a CPE entering a power-saving state.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
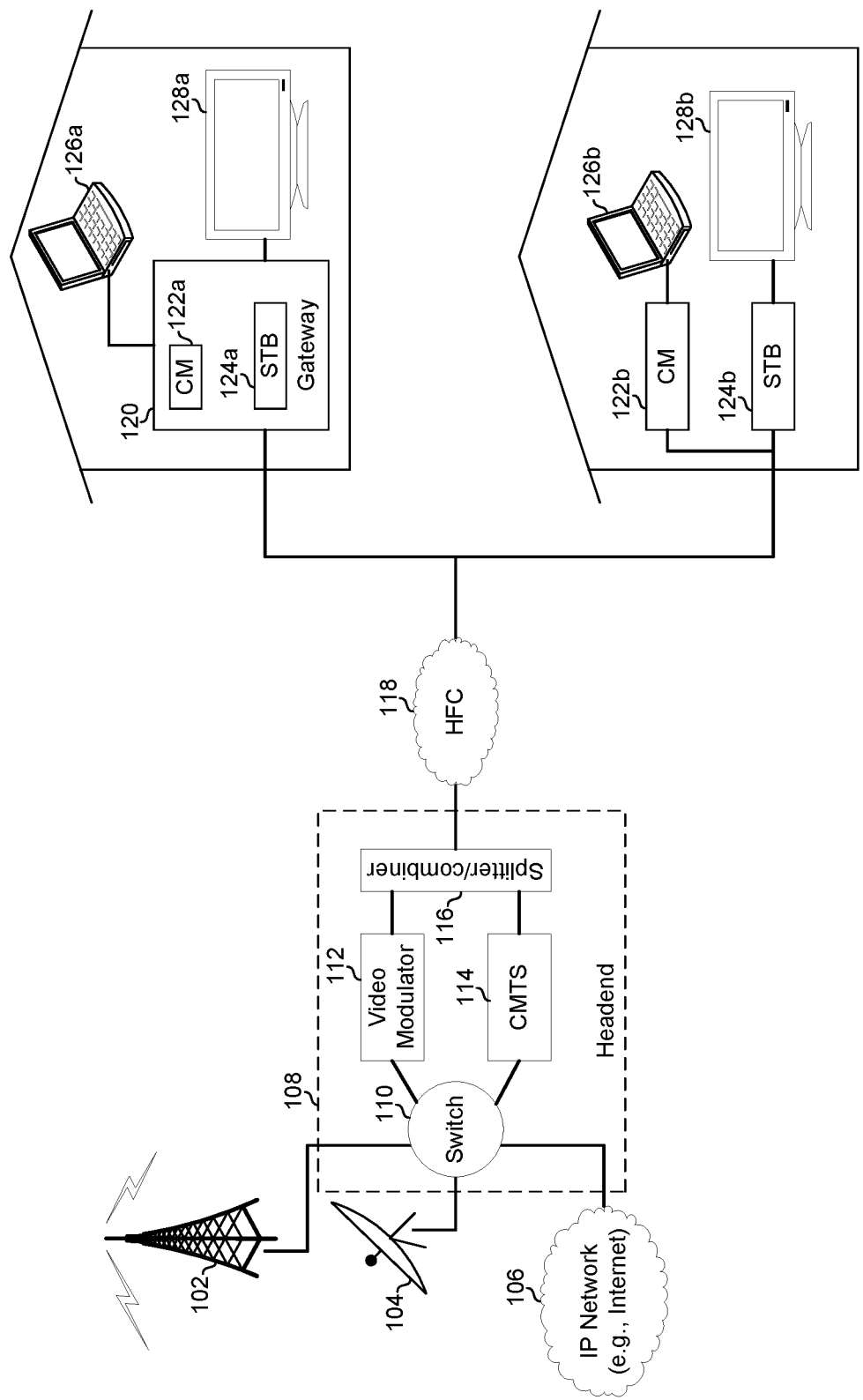
FIG. 1 depicts an exemplary DOCSIS network which may take advantage of aspects of the invention.

FIG. 1 depicts an exemplary DOCSIS network which may take advantage of aspects of the present invention. Shown in FIG. 1 is a terrestrial television antenna 102, a satellite dish 104, an Internet Protocol (IP) network 106, a headend 108, a wide area network (e.g., hybrid fiber-coaxial (HFC) network) 118, a gateway 120, end systems 126a and 126b (e.g., computers), end systems 128a and 128b (e.g., televisions), a cable modem 122b, and a set-top box 124b. The headend 108 comprises a switch 110, a video modulator 112, a cable modem termination system (CMTS) 114, and a splitter/combiner 116. The gateway 120 may be an instance of the gateway 120 described below with respect to FIG. 4, and may comprise a cable modem module 122a, and a set-top box module 124a. Each of cable modems 122a and 122b may be an instance of the cable modem module 122 described with respect to FIG. 2. Each of set-top boxes 124a and 124b may be an instance of the set-top box module 124 described with respect to FIG. 3.

For downstream traffic, the headend 108 may receive television signals via the antenna 102 and the satellite dish 104, and may receive data via the IP network 106. The switch 110 may convey the television signals to the video modulator 112 and the data to the CMTS 114. The video modulator 112 may modulate the received television signals onto a carrier. The CMTS 114 may modulate the received data onto a carrier. The splitter/combiner 116 may combine the outputs of the video modulator 112 and the CMTS 114 and output the combined signal onto the wide area network (WAN) 118 for distribution to CPE. The cable modems 122a and 122b may process the portion of the combined signal that carries the data from the CMTS 114, and the set-top box modules 124a and 124b may process the portion of the combined signal that carries the video from the video modulator 112.

For upstream data, the end systems 126a and 126b may transmit packets to the cable modem 122a and 122b, respectively, which may then modulate the packets onto a carrier for transmission via the WAN 118. The splitter/combiner 116 may then convey the data to the CMTS 114. The CMTS 114 may process the data signals (e.g., verify that they came from a registered cable modem) and convey the data to the IP network 106.

The CMTS 114 may manage connections to the cable modems 122a and 122b. This may include, for example: participating in ranging operations to control the power at which the cable modems 122a and 122b transmit; forwarding of dynamic host configuration protocol (DHCP) messages between a DHCP server and the cable modems 122a and 122b; forwarding of time of day messages between a time of day server and the cable modems 122a and 122b; and managing registration of the cable modems 122a and 122b to grant the cable modems network (e.g., Internet) access. The registration process for a cable modem 122 may comprise the cable modem 122 sending a registration request along with its configuration settings, and the CMTS 114 accepting or rejecting the cable modem based on the configuration settings. The registration process may additionally comprise an exchange of security keys, certificates, or other authentication information.

Conventionally, after a cable modem has successfully registered with the CMTS 114, the CMTS 114 will deregister the cable modem if the cable modem does not communicate with the CMTS 114 for a predetermined period of time. Accordingly, aspects of the present invention may enable a cable modem 122 and the CMTS 114 to coordinate the cable modem 122 operating in a low-power mode ("sleeping") without being deregistered by the CMTS 114. Such coordination between the cable modem 122 and the CMTS 114 may be accomplished through communication of one or more messages, as is described, for example, with respect to FIG. 7A and/or FIG. 7B.

Aspects of the invention may enable media access planning in a downstream direction. In this regard, the CMTS 114 may communicate (e.g., via one or more messages) with CPEs (e.g., cable modems) that it serves to coordinate when and how (e.g., on which channel(s)) the CMTS 114 will communicate with the CPEs. Downstream planning may enable a CPE to sleep until the next time at which the plan requires it to listen on the channel(s).

Aspects of the invention may enable the CMTS 114 to dedicate a timeslot for the transmission of messages to one or more sleeping CPEs. The timeslot may occur at intervals that are independently determinable by the one or more CPEs. That is, duration of the intervals can be determined by each of the one or more CPEs without those devices having to listen for messages outside of the dedicated timeslot. In an example embodiment, such an interval may be of a predetermined duration that is made known to the one or more CPEs prior to the start of the timeslot. In another example embodiment, the duration of such an interval may be determined independently by each of the one or more CPEs while the interval is in progress. In such an embodiment, the determination may be based on context information (e.g., time of day, previous traffic, etc.) available to the one or more CPEs. Such a scheme may be analogous to an unsolicited grant service, but in the downstream direction. Accordingly, a CPE (e.g., cable modem 122, set-top box 124, or gateway 120) may sleep for one or more of the intervals between occurrences of the timeslot, wake up and listen to the channel during the timeslot, and then go back to sleep. Such dedicated timeslots in the downstream direction may coincide in time with, and/or have an independently determinable time relationship (e.g., a predetermined, fixed time relationship) to, unsolicited grants in the upstream direction. In this manner, if there is no upstream activity during the corresponding unsolicited grant, then adjustments may be made to, for example, the duration of the timeslot, the interval between occurrences of the timeslot, etc. The messages communicated during occurrences of the timeslot may, for example, contain wake up messages. As another example, the messages communicated during occurrences of the timeslot may comprise data communicated to and/or from "always on" end systems (e.g., appliances, utility meters, etc.) that may need to communicate over the WAN via a CPE even when the CPE is in a power-save mode.

In an embodiment of the invention, one or more logical channels may be dedicated for the communication of messages (e.g., messages pertaining to power management) and/or for the communication of traffic to "always-on" end systems, even when a CPE via which the "always-on" end system communicates is in a power-saving mode. For example, in systems utilizing DVB-C2 or DVB-T2, such traffic can be mapped to a dedicated physical layer pipe.

Figure 2:
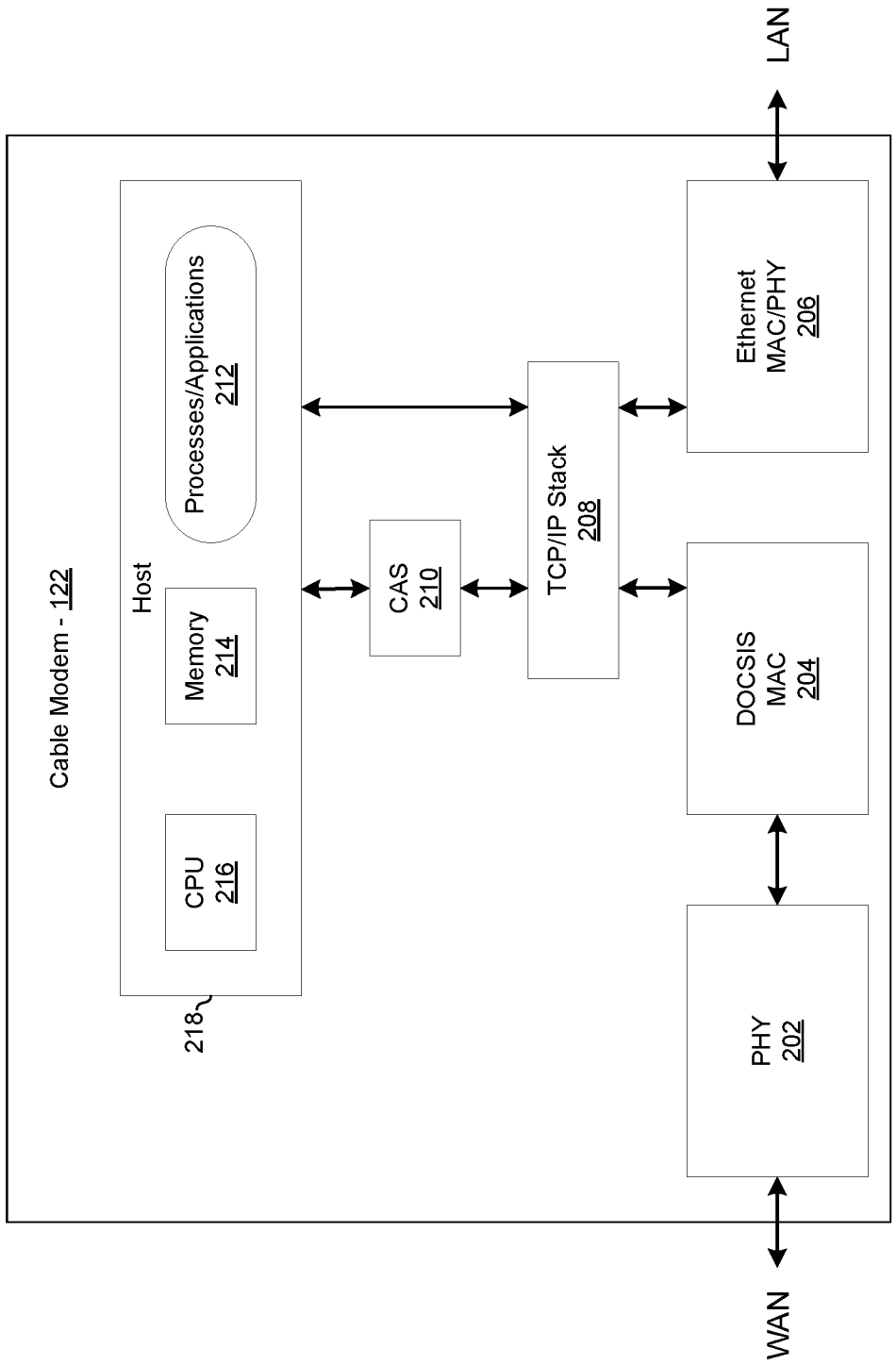
FIG. 2 depicts a cable modem as an example of customer premise equipment (CPE).

FIG. 2 depicts a cable modem as an example of customer premise equipment (CPE). The cable modem 122 comprises a physical layer transceiver (PHY) module 202, DOCSIS medium access controller (MAC) module 204, Ethernet MAC/PHY module 206, a TCP/IP stack module 208, a conditional access module 210, and a host 218 comprising a CPU 216 and memory module 214 which interoperate to execute applications/processes 212.

The PHY module 202 may be operable to receive digital signals from the MAC 204, generate corresponding analog symbols, and transmit the symbols onto the WAN 118. Similarly, the PHY module 202 may be operable to receive analog symbols over the WAN 118, convert the symbols to digital signals, and convey the digital signals to the MAC module 204. The PHY module 202 may be an instance of the PHY module 500 described below with respect to FIG. 5A. The MAC module 204 may be operable to implement DOCIS media access control protocol(s) for regulating when and/or how the cable modem 122 transmits on the WAN 118. The Ethernet MAC/PHY module 206 may be operable to implement Ethernet physical layer and data link layer protocols such that the cable modem 220 may transmit and receive via an Ethernet local area network (LAN). The TCP/IP stack module 208 may be operable to implement functionality of OSI layers 3 and higher layers to enable the host 218 to communicate via the WAN 118 and/or the LAN. The conditional access module 210 may be operable to prevent the host from transmitting and/or receiving DOCSIS traffic via the WAN 118 if the cable modem 122 is not subscribed to such services. The CPU 216 may execute instructions stored in the memory module 214 and store run-time data in the memory module 214 to execute various processes and/or applications (e.g., an operating system).

In operation, if and/or when the cable modem 122 operate in a power-saving mode (a mode in which one or more of its components normally used for transmission and/or reception are powered down) may be controlled based on a variety of factors such as, for example, statistics and/or patterns of traffic in the network, number and/or types of devices in the premises served via the modem 122, and/or input from a user in the premises served via the modem 122. Such components may comprise a media access controller (or portions thereof) of the cable modem 122 and/or a PHY (or portions thereof) of the cable modem 122. Transitions into and/or out of a power-saving mode may be coordinated via an exchange of messages such as, for example, described below in FIGS. 7A and 7B.

Figure 3:
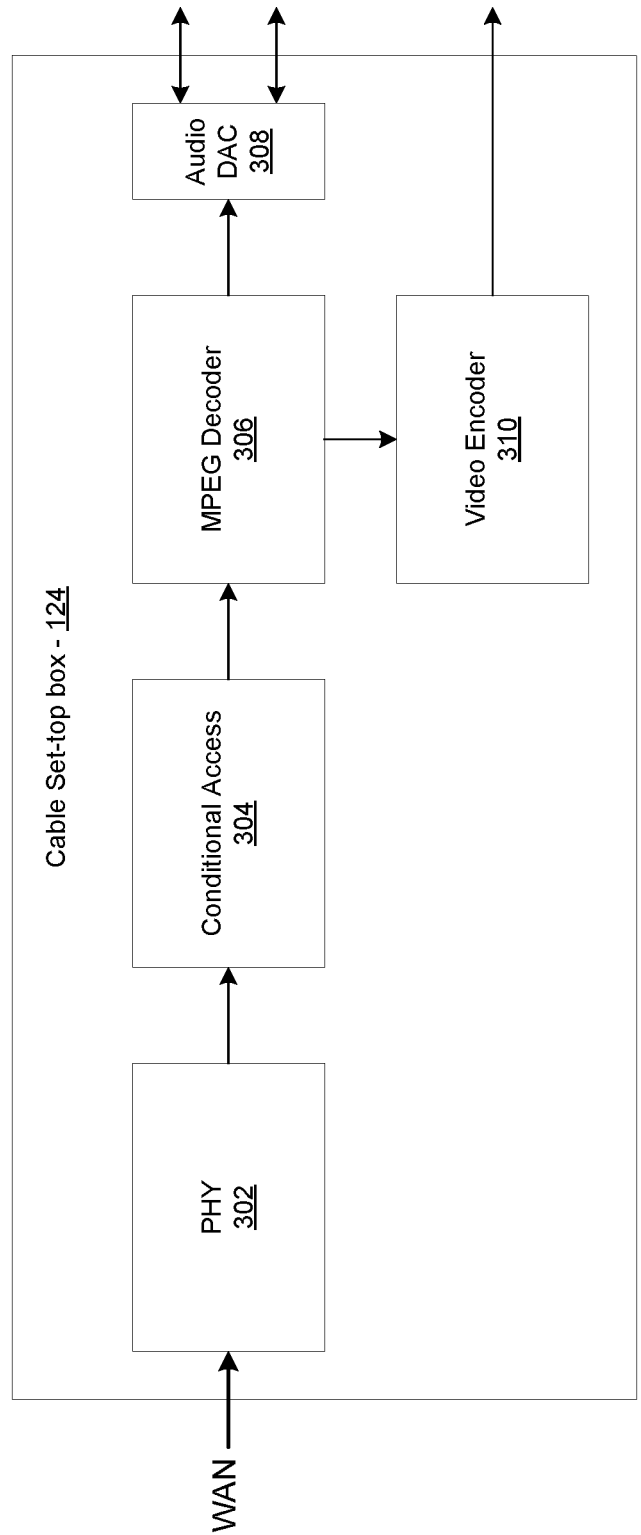
FIG. 3 depicts a cable set-top box as an example of customer premise equipment (CPE).

FIG. 3 depicts a cable set-top box as an example of customer premise equipment (CPE). The set-top box 124 comprises a physical layer transceiver (PHY) module 302, a conditional access module 304, an MPEG decoder module 306, audio digital-to-analog converter (DAC) module 308, and video encoder module 310.

The PHY module 302 may be operable to receive analog symbols over the WAN 118, convert the symbols to digital signals, and convey the digital signals to the MAC module 204. The PHY module 302 may be an instance of the PHY module 500 described below with respect to FIG. 5A. The conditional access module 304 may be operable to prevent the set-top box 124 from decoding audio/video content to which it is not subscribed. The MPEG decoder module 306 may be operable to decode MPEG streams carried in the signal received via the WAN 118. The Audio DAC module 308 may be operable to convert one or more digital audio signals output by the MPEG decoder 306 into an analog signal for output to one or more speakers. The video encoder 310 may be operable to output one or more digital video signals output by the MPEG decoder 306 according to one or more video protocols such as HDMI or DisplayPort.

In operation, if and/or when the set-top box 124 operates in a power-saving mode (a mode in which one or more of its components normally used for transmission and/or reception are powered down) may be controlled based on a variety of factors such as, for example, statistics and/or patterns of traffic in the network, number and/or types of devices in the premises served via the set-top box 124, and/or input from a user in the premises served via the set-top box 124. Such components may comprise a media access controller (or portions thereof) of the set-top box 124 and/or a PHY (or portions thereof) of the set-top box 124. Transitions into and/or out of a power-saving mode may be coordinated via an exchange of messages such as, for example, described below in FIGS. 7A and 7B.

Figure 4:
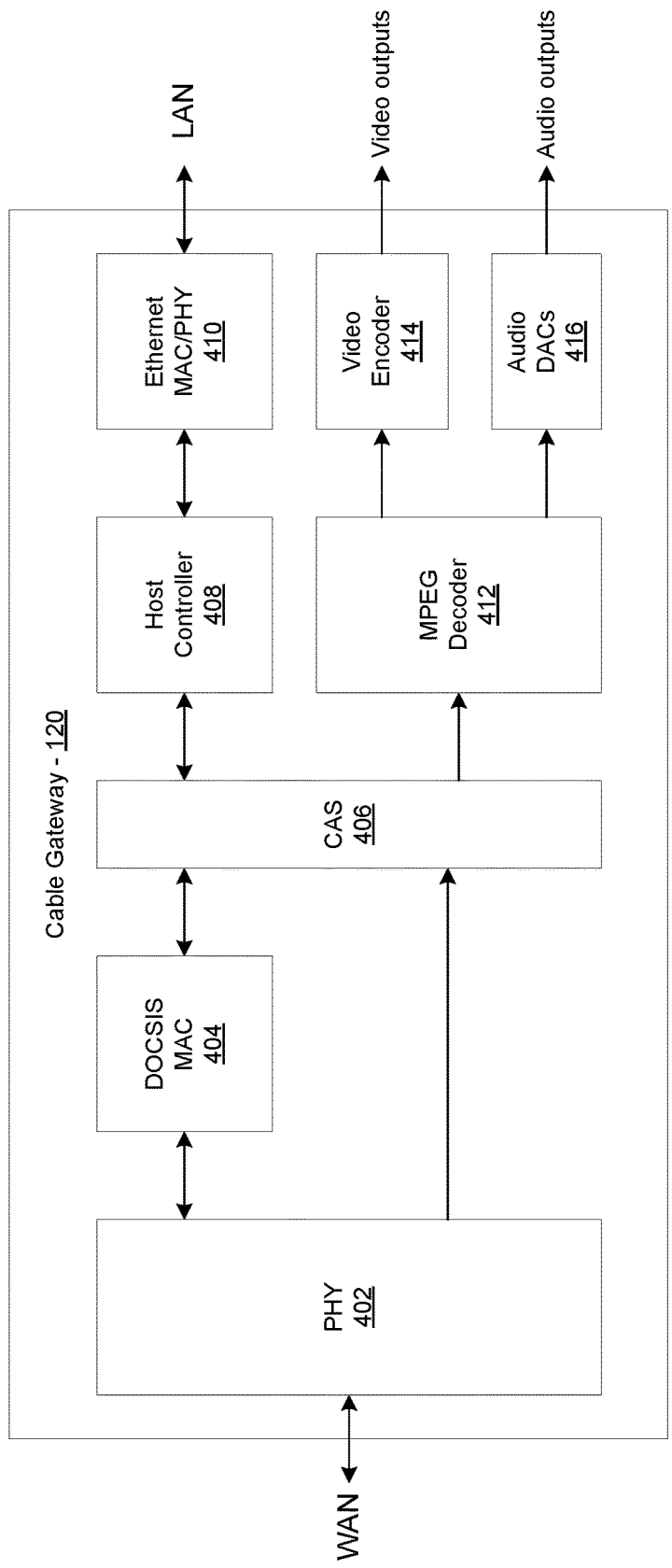
FIG. 4 depicts a cable gateway as an example of customer premise equipment (CPE).

FIG. 4 depicts a cable gateway as an example of customer premise equipment (CPE). The gateway 120 comprises a PHY module 402, a DOCSIS MAC module 404, a conditional access module 406, a host controller module 408, an Ethernet MAC/PHY module 410, an MPEG decoder module 412, a video encoder module 414, and an audio DAC module 416.

The PHY module 402 may be operable to receive digital signals from the MAC 404, generate corresponding analog symbols, and transmit the symbols onto the WAN 118. Similarly, the PHY module 402 may be operable to receive analog symbols over the WAN 118, convert the symbols to digital signals, and convey the digital signals to the MAC module 404. The PHY module 402 may be an instance of the PHY module 500 described below with respect to FIG. 5A.

The MAC module 404 may be operable to implement DOCIS media access control protocol(s) for regulating when and/or how the gateway 120 transmits on the WAN 118. The conditional access module 406 may be operable to prevent the gateway 120 from decoding audio/video content and/or data to which it is not subscribed. The host controller module 408 may be operable to implement OSI layer 3 and higher OSI layers to enable communication between the WAN 118 and the LAN network via the Ethernet MAC/PHY module 410. The Ethernet MAC/PHY module 410 may be operable to implement Ethernet physical layer and data link layer protocols such that the gateway 120 may transmit and receive via an Ethernet local area network (LAN). The MPEG decoder module 412 may be operable to decode MPEG streams carried in the signal received via the WAN 118. The Audio DAC module 416 may be operable to convert one or more digital audio signals output by the MPEG decoder 412 into an analog signal for output to one or more speakers. The video encoder 414 may be operable to output one or more digital video signals output by the MPEG decoder 412 according to one or more video protocols such as HDMI or DisplayPort.

In operation, if and/or when the gateway 120 operates in a power-saving mode (a mode in which one or more of its components normally used for transmission and/or reception are powered down) may be controlled based on a variety of factors such as, for example, statistics and/or patterns of traffic in the network, number and/or types of devices in the premises served via the gateway 120, and/or input from a user in the premises served via the gateway 120. Such components may comprise a media access controller (or portions thereof) of the gateway 120 and/or a PHY (or portions thereof) of the gateway 120. Transitions into and/or out of a power-saving mode may be coordinated via an exchange of messages such as, for example, described below in FIGS. 7A and 7B.

Figure 5A:
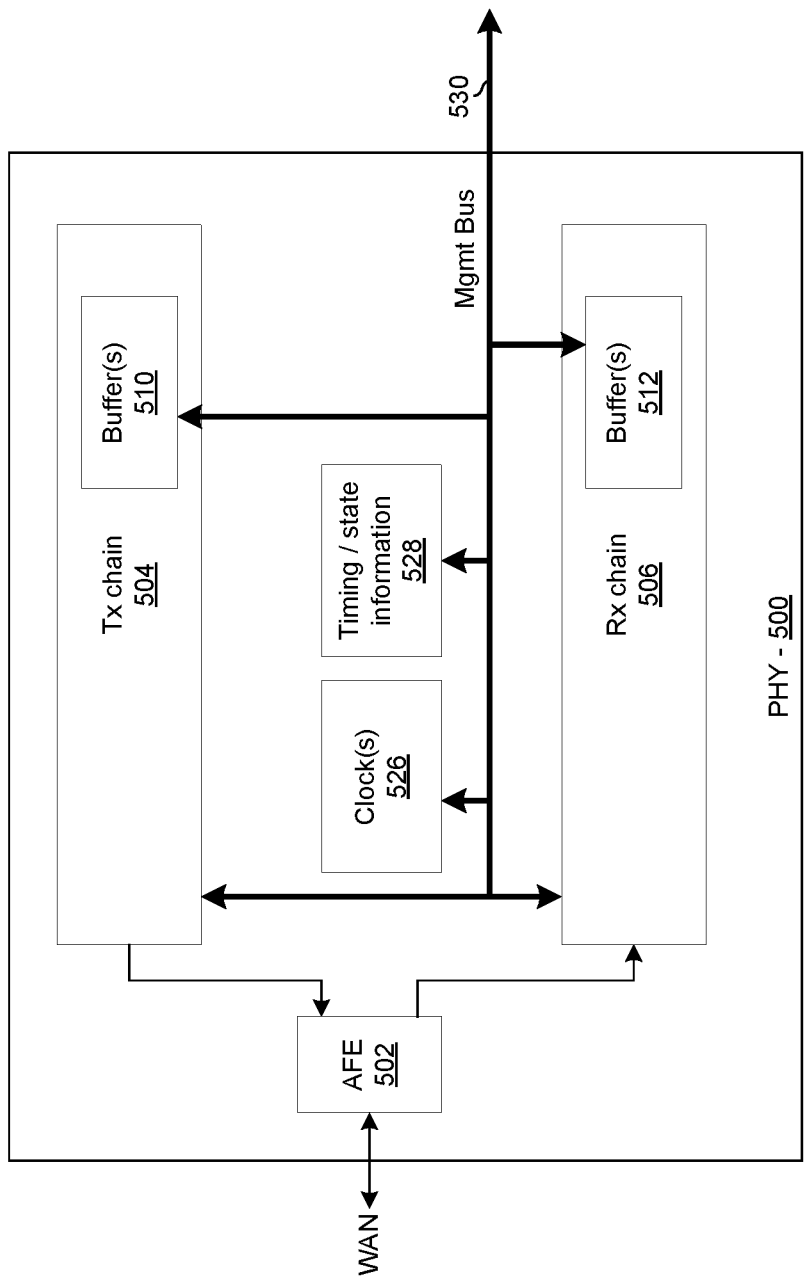
FIG. 5A depicts an exemplary physical layer transceiver (PHY) of a CPE which supports low-power wide area networking.

FIG. 5A depicts an exemplary physical layer transceiver (PHY) of a CPE which supports low-power wide area networking. The PHY 500 comprises an analog front end (AFE) 502, a transmit chain 504, a receive chain 506, a clock module 526, and a memory module 528 for storing timing and/or state information.

For receive operations, the AFE 502 may be operable to amplify an analog signal received via the WAN 118, down-convert the received signal, filter the received signal, convert the filtered signal to a digital representation, and convey the digital signal to the demodulator 506. For transmit operations, the AFE 502 may be operable to receive a digital signal from the transmit chain 504, convert the digital signal to an analog representation, filter the analog signal, up-convert the signal, and amplify the signal for transmission onto the WAN 118. The AFE 502 may for example, comprise components 552-558 described below with respect to FIG. 5B and components 572-578 described below with respect to FIG. 5C.

The transmit chain 504 may be operable to perform operations to support transmission of data onto the WAN 118. Such operations may comprise encoding, modulating, converting to analog, filtering, and/or amplifying a signal received from higher OSI layers. In an exemplary embodiment of the invention, the Tx chain 504 may comprise one or more buffers 510 which may be operable to store data to be transmitted while the CPE in which the PHY resides is in a power-saving state.

The receive chain 504 may be operable to perform operations to support reception of data onto the WAN 118. Such operations may comprise amplifying, demodulating, filtering, converting to digital, and/or decoding a signal received from the physical medium (e.g., coaxial cable). In an exemplary embodiment of the invention, the Rx chain 506 may comprise one or more buffers 512 which may be operable to store received data while the CPE in which the PHY resides is in a power-saving state.

The clock module 526 may be operable to generate one or more oscillating signals for synchronizing circuitry of the PHY 500 and/or for keeping track of time. The clock module 526 may, for example, comprise a real time clock that enables scheduling events such as transitions into and out of a power-saving mode of operation and/or keeping track of when MAC management messages, contention opportunities, and/or unsolicited upstream and/or downstream grants will occur.

The memory module 528 may be operable to store timing information such as: times at which the CPE is to transition between different modes of operation, amount of time the CPE has been in a particular mode of operation, times at which a message was received, times at which a message is expected, etc. Additionally or alternatively, the memory module 528 may store state information that may enable the PHY 500 to quickly resume communications upon waking from a power-saving mode. Such state info may comprise, for example, upstream frequency to utilize for transmission, frequency on which to listen for reception, symbol rate at which to transmit, modulation profile, carrier offset, equalizer/filter settings, and/or gain settings. In an exemplary embodiment of the invention, before components of a CPE (e.g., a MAC of the CPE or portions of the CPE's PHY) go to sleep, those components may store state information to the module 528. This information may be utilized upon the components waking from the power-saving mode to reduce the time necessary for the components to be ready to receive data from the WAN 118.

Figure 5B:
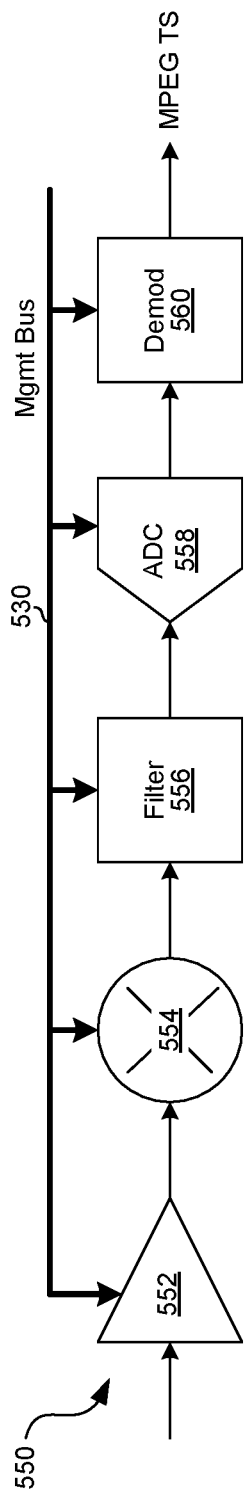
FIG. 5B depicts components of a receive chain of an exemplary PHY.

FIG. 5B depicts components of a receive chain of an exemplary PHY. The receive chain 500 comprises the following components: a low noise amplifier (LNA) module 552, a mixer module 554, a filter module 556, an analog-to-digital converter (ADC) 558, and a demodulator 560.

The low noise amplifier (LNA) 552 may be operable to amplify signals received via the WAN 118. The mixer 554 may be operable down-convert received signals. The filter 556 may be operable to select one or more sub-bands of the received, down-converted signal. The analog-to-digital converter (ADC) 558 may be operable to convert the analog signal output by filter 706 to a digital representation. The demodulator 560 may be operable to demodulate the digital signal from the ADC 558 to recover an MPEG transport stream (MPEG-TS) contained therein.

In operation, a mode of operation of various components (e.g., amplifier 552, mixer 554, filter 556, data converter 558, and demodulator 560) of the receive chain 550 may be controlled based on whether the CPE in which the receive chain 550 resides is in a power-saving mode. While in the power-saving mode, one or more of the components may be powered-down. A component may be powered-down by, for example, reducing a supply voltage and/or supply current provided to the component and/or reducing the frequency of a clock signal input to the component. Additionally or alternatively, components may be powered down by configuring them into a different mode of operation. For example, the number of poles of the filter 556 may be reduced, the resolution of the ADC 558 may be reduced, the gain and/or linearity of the amplifier 552 may be reduced, the demodulator 560 may be configured to process low-order modulation schemes, etc. The configuration of the components may be controlled via the management bus 530.

Figure 5C:
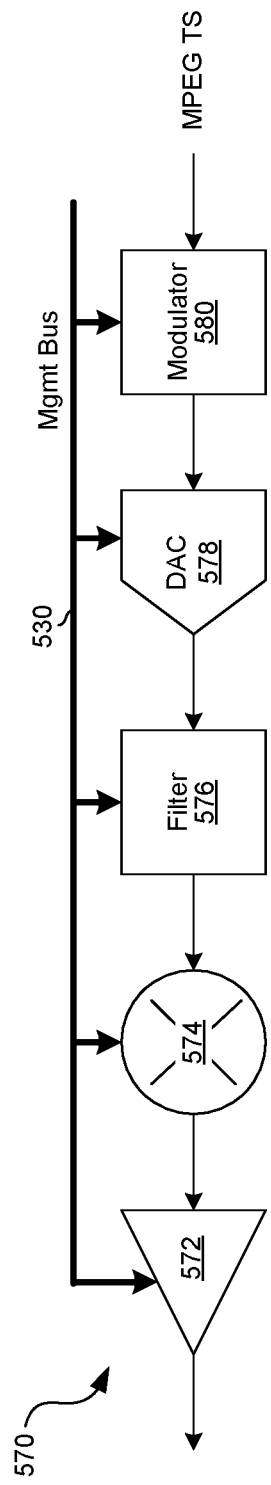
FIG. 5C depicts components of a transmit chain of an exemplary PHY.

FIG. 5C depicts components of a transmit chain of an exemplary PHY. The transmit chain 570 comprises a power amplifier (PA) module 572, a mixer module 574, a filter module 576, a digital-to-analog converter (DAC) 578, and a modulator 580.

The power amplifier (PA) 572 may be operable to amplify signals for transmission onto the WAN 118. The mixer 574 may be operable up-convert signals to be transmitted. The filter 576 may be operable to filter out undesired signals output by the DAC 578. The DAC 578 may be operable to convert the digital signal output by modulator 580 to an analog representation. The modulator 580 may be operable to modulate a MPEG transport stream onto one or more carriers.

In operation, a mode of operation of various components (e.g., amplifier 572, mixer 574, filter 576, data converter 578, and modulator 580) of the transmit chain 570 may be controlled based on whether the CPE in which the transmit chain 570 resides is in a power-saving mode. While in the power-saving mode, one or more of the components may be powered-down. A component may be powered-down by, for example, reducing a supply voltage and/or supply current provided to the component and/or reducing the frequency of a clock signal input to the component. Additionally or alternatively, components may be powered down by configuring them into a different mode of operation. For example, the number of poles of the filter 576 may be reduced, the resolution of the ADC 578 may be reduced, the gain and/or linearity of the amplifier 572 may be reduced, the demodulator 580 may be configured to process low-order modulation schemes, etc. The configuration of the components may be controlled via the management bus 530.

FIG. 6 illustrates a media access controller of an exemplary CPE. The MAC 610 may be capable of operating in multiple modes of operation, with different modes of operation being characterized by different power consumption. In an exemplary embodiment, the MAC 610 may support a "normal" mode characterized by higher power consumption and a "sleep" mode characterized by lower power consumption, and may occasionally and/or periodically be put into the sleep mode to reduce power consumption.

In some instances, the PHY (e.g., PHY 500) of a CPE may operate in a higher-power mode (i.e., be "awake") while the MAC (e.g., MAC 610) of the CPE remains in a low-power mode (i.e., be "asleep"). During such times, the PHY may resynchronize a clock utilized for transmitting signals onto the WAN 118 to the clock utilized for receiving signals via the WAN 118. Such synchronization may reduce the time needed to be ready to transmit upon the MAC transitioning out of the low-power mode.

In an exemplary embodiment of the invention, channel bonding as enabled in DOCSIS 3.0 may be controlled in coordination with the sleep cycle of the CPE. For example, while awake, a CPE may receive and/or transmit on multiple channels, but while in a sleep mode, only one channel may be allocated for the CPE (the one channel could also be, for example, shared among multiple sleeping CPEs). Communications (e.g., MAC management messages and/or other specialized messages or signals) between the CMTS 114 and the CPE in which the AMC 610 resides may coordinate channel bonding.

Figure 7A:
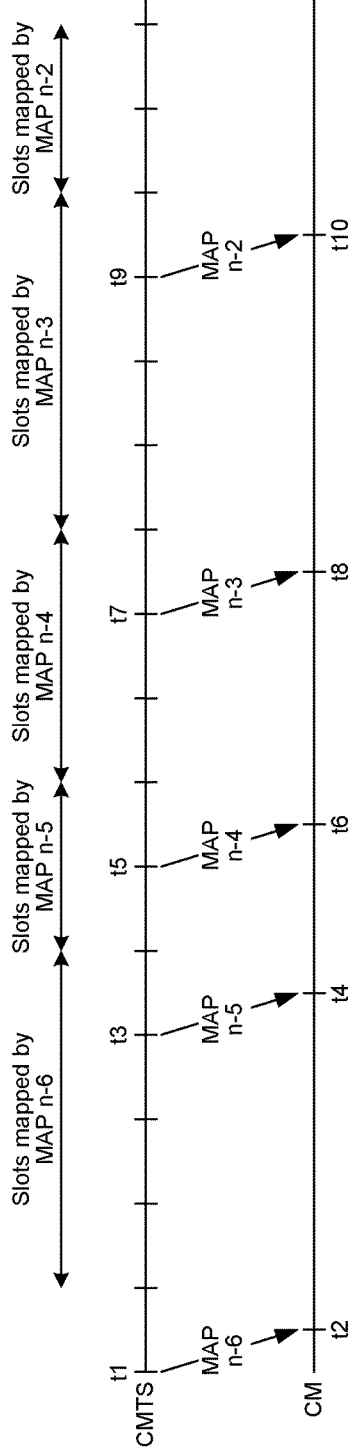
FIGS. 7A and 7B illustrate a transition to a state in which MAC management messages are transmitted at predetermined intervals.
Figure 7B:
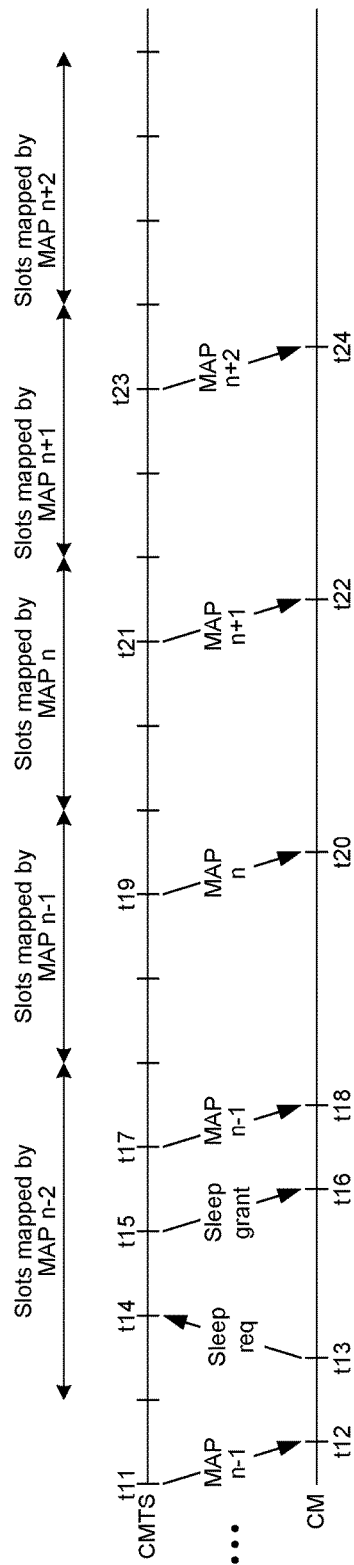

FIGS. 7A and 7B illustrate a transition to a state in which MAC management messages are transmitted at predetermined intervals. Referring to FIGS. 7A and 7B, there is shown MAP messages n–6 through n communicated at non-independently-determinable intervals. That is, from the cable modem's perspective the duration of each of the intervals (t3-t1), (t5-t3), (t7-t5), and (t9-t7) are random and, thus the cable modem has to continuously listen. At time t13, however, the cable modem sends a request that it be permitted to enter a power-saving mode of operation. The message may be, for example, a MAC management message wherein the contents of its Type Value field are uniquely associated with a sleep request.

At time t15, the CMTS responds with a message granting the cable modem permission to sleep. The CMTS may determine to grant the request based on various considerations such as network traffic, type(s) of devices in the network. The message granting the sleep request may also include parameters such as how long the cable modem is permitted to sleep, whether the cable modem must listen for messages while it is sleeping, the timing of MAC management messages, contention periods, and/or timeslots reserved for the cable modem while the modem is sleeping, etc.

Subsequent to the grant at time t15, the CMTS may send MAP messages at independently determinable intervals until the modem transitions out of the power-saving mode back to a normal mode of operation. That is, the duration of each of the intervals (t19-t17), (t21-t19), and (t23-t21) is either predetermined and known to the cable modem prior to the start of the interval, or determinable from context during the interval (without the cable modem having to listen during the interval). In the example embodiment depicted, each of the intervals (t19-t17), (t21-t19), and (t23-t21) are of a common, predetermined duration. While in the power-saving mode, the cable modem may track time such that it knows when the next MAP message will be sent. In this manner, should the cable modem desire, it can transition out of the power-saving state just in time to hear the MAP message, receive and process the MAP message, and then return to the power-saving state immediately thereafter.

FIGS. 8A and 8B illustrate activity on a network channel before and during a CPE entering a power-saving state. Shown in these two figures is activity on an exemplary WAN channel. During timeslots 802, MAC management messages, such as UCD, SYNC, and/or MAP messages, may be transmitted by the CMTS. The timeslots 804 may correspond to, for example, contention periods and/or timeslots reserved for a particular CPE. In FIG. 8A, the timeslots 802 occur at non-independently-determinable intervals. That is, from the cable modem's perspective, the duration of each of the intervals Δ1, Δ2, and Δ3 is random and, thus the cable modem has to continuously listen. Similarly, timeslots 804 occur at non-independently-determinable intervals. That is, from the cable modem's perspective, the duration of each of the intervals Δ4, Δ5, and Δ6 is random and, thus the cable modem has to continuously listen. In FIG. 8B, after the CPE has been permitted to enter a power-saving mode of operation, the timeslots 802 and 804 occur at predetermined, fixed intervals. That is, the cable modem can independently determine the duration of each of Δ8-Δ13 and power off and on its receiver accordingly.

Figure 9:
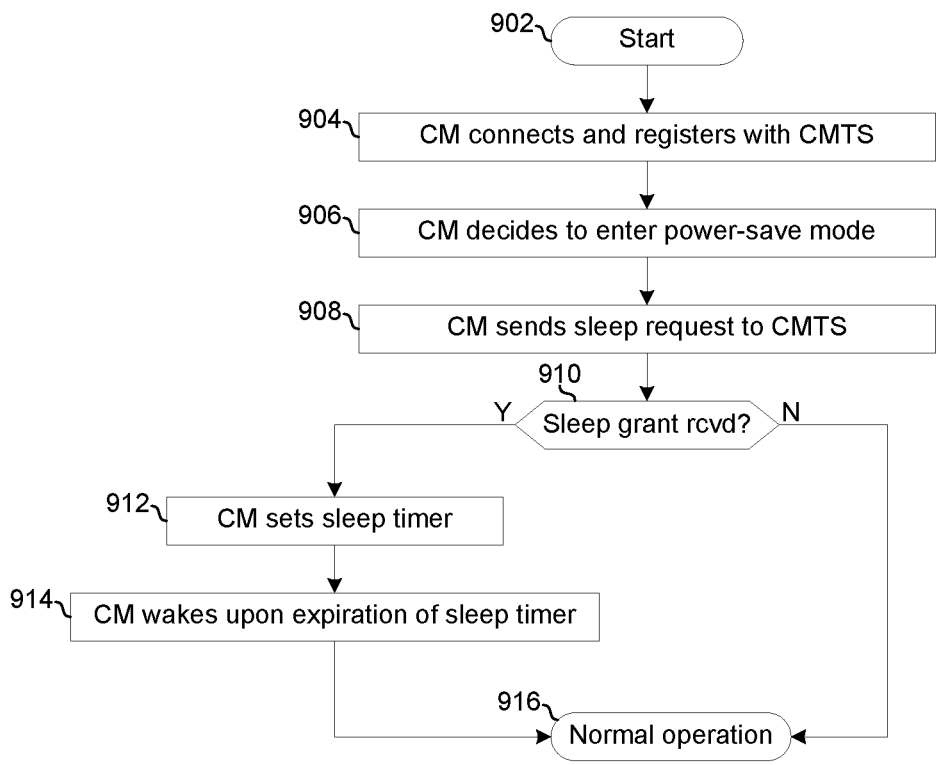
FIG. 9 is a flowchart illustrating exemplary steps for managing a power-saving state in a client device of a wide area network.

FIG. 9 is a flowchart illustrating exemplary steps for managing a power-saving state in a client device of a wide area network. The steps are described with respect to a cable modem, but may be implemented in other types of devices. The exemplary steps begin with start step 902 and proceed to step 904. In step 904, the cable modem connects to the WAN and exchanges messages with the CMTS to be registered on the network. In step 906, the cable modem decides to transition to a power-saving state. This decision may be based, for example, on past traffic patterns and/or statistics, expected future traffic, time of day, type and/or number of devices connected to the cable modem, a level of service to which the cable modem is subscribed, an amount of bandwidth that the cable modem has used in the billing period or has left to use in the billing period, or any other suitable considerations.

In step 908, the cable modem sends a request for permission to transition to the sleep state. The request may comprise, for example, a MAC management message wherein the contents of its Type Value field are uniquely associated with a request to enter a sleep mode. The message may also comprise various information such as, for example, how long the cable modem desires to sleep, the traffic expected by the cable modem, the number and/or types of devices downstream from the cable modem, the channel(s) on which the cable modem may receive and/or transmit while in the power-saving mode, the type of signals that the cable modem may transmit and/or receive while in the power-saving mode, and/or any other suitable information.

In step 910, it is determined whether the CMTS granted the cable modem's request to enter the power-saving mode of operation. If such a grant is not received, then the exemplary steps advance to step 916 and the cable modem does not transition to the low-power mode. If, on the other hand, the CMTS does grant the request, then the exemplary steps advance to step 912.

In step 912, the cable modem may set a sleep timer. The initial and/or terminal value of the timer may be determined based on a variety of factors. For example, the timer may be set based on accuracy (e.g., drift) of one or more clocks in the cable modem, type and/or number of devices downstream of the cable modem (e.g., within the premises served by the cable modem), past traffic patterns and/or statistics, the timing at which the CMTS has indicated MAC management messages will be sent, the timing at which the CMTS has indicated contention periods will, the timing at which the CMTS has indicated transmit opportunities for the cable modem will occur, and/or any other suitable factors. The sleep timer may be set to compensate for an amount of time it takes the cable modem to transition out of the power-saving state and be ready to transmit or receive. For example, the sleep timer may be set to wake the cable modem up and amount of time, X, before the next MAP message, where X is the transition time it takes the cable modem to power up circuitry for receiving a MAP message. As another example, the cable modem may desire to sleep for two MAP cycles and, therefore, may set its sleep timer to 2Y-X, where Y is the duration of the interval between MAP messages.

In step 914, upon expiration of the sleep timer, the cable modem may transition out of the low-power mode and, in step 916, return to normal operation.

Figure 10:
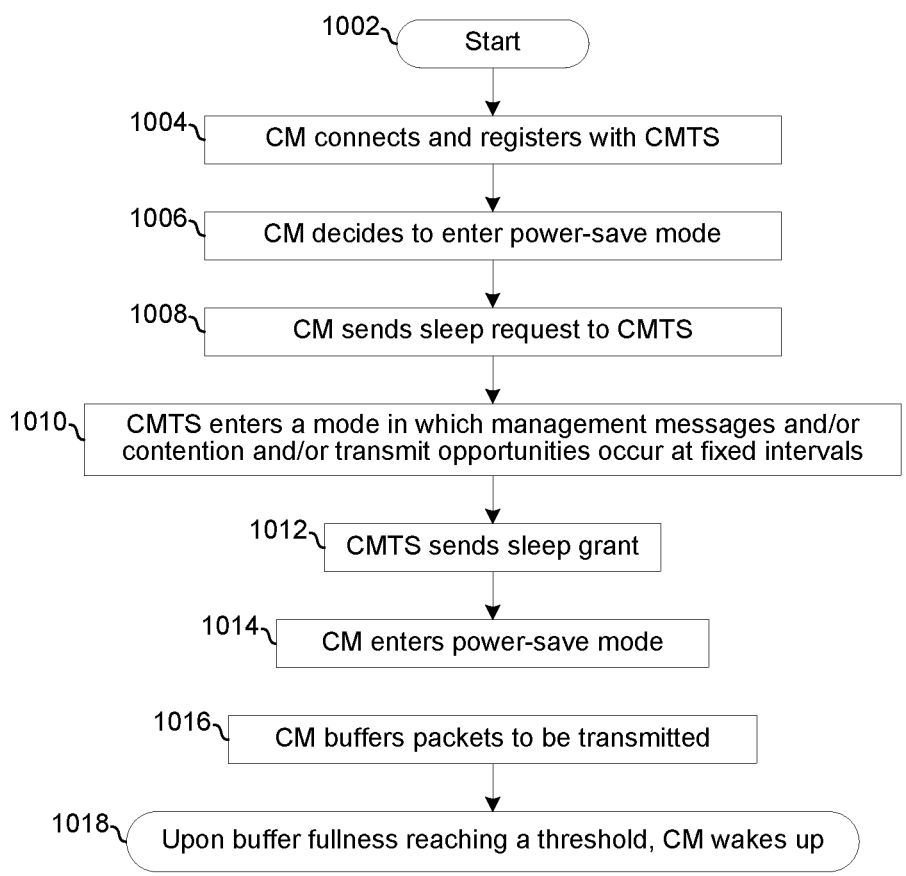
FIG. 10 is a flowchart illustrating exemplary steps for managing a power-saving state in a client device of a wide area network.

FIG. 10 is a flowchart illustrating exemplary steps for managing a power-saving state in a client device of a wide area network. The steps are described with respect to a cable modem, but may be implemented in other types of devices. The exemplary steps begin with start step 1002 and proceed to step 1004. In step 1004, the cable modem connects to the WAN and exchanges messages with the CMTS to be registered on the network. In step 1006, the cable modem decides to transition to a power-saving state. This decision may be based, for example, on past traffic patterns and/or statistics, expected future traffic, time of day, type and/or number of devices connected to the cable modem, a level of service to which the cable modem is subscribed, an amount of bandwidth that the cable modem has used in the billing period or has left to use in the billing period, or any other suitable considerations.

In step 1008, the cable modem sends a request for permission to transition to the sleep state. The request may comprise, for example, a MAC management message wherein the contents of its Type Value field are uniquely associated with a request to enter a sleep mode. The message may also comprise various parameters such as, for example, how long the cable modem desires to sleep, the traffic expected by the cable modem, the number and/or types of devices downstream from the cable modem, the channel(s) on which the cable modem may receive and/or transmit while in the power-saving mode, the type of signals that the cable modem may transmit and/or receive while in the power-saving mode, and/or any other suitable information.

In step 1010, the CMTS decides to permit the cable modem to sleep and, accordingly, transitions to a mode in which it one or more of the following are true: MAC management messages are sent at independently determinable (e.g., predetermined) intervals; contention opportunities occur at independently determinable (e.g., predetermined) intervals; timeslots reserved for communications by the cable modem occur at independently determinable (e.g., predetermined) intervals.

In step 1012, the CMTS sends the sleep grant to the cable modem. The sleep grant may comprise, for example, a MAC management message wherein the contents of its Type Value field are uniquely associated with a grant of permission to enter a sleep mode. The message may also comprise various information such as, for example, how long the cable modem is permitted to sleep, the traffic expected by the CMTS, the channel(s) on which the CMTS may receive from and/or transmit to the cable modem while the cable modem is in the power-saving mode, the type of signals that the cable modem must and/or may transmit and/or receive while in the power-saving mode, and/or any other suitable information. In step 1014, the cable modem may transition to the power-saving mode.

In step 1016, the cable modem may buffer packets for future processing by the cable modem while it is in the power-saving mode. For example, portions of the PHY may remain powered-up in the low-power mode and those portions may be operable to receive traffic from the WAN and buffer it until other portions of the cable modem (e.g., the MAC and/or other portions of the PHY) transition out of the power-saving mode. As another example, portions of the MAC may remain powered-up in the low-power mode and those portions may be operable to receive traffic from higher OSI layers (e.g., traffic generated by the host processor of the cable modem and/or received from devices in the premises served by the cable modem) and buffer the traffic until other portions of the cable modem (e.g., the PHY and/or other portions of the MAC) transition out of the power-saving mode.

In step 1018, upon buffer fullness reaching a set threshold, the cable modem may wake up and process the buffered traffic. For buffered traffic to be transmitted on the WAN, the transition out of the low-power mode may be timed such that the cable modem is ready to transmit the buffered traffic just as the next contention period or timeslot reserved for the cable modem is about to occur. The buffer threshold may be set based on, for example, past traffic patterns and/or statistics, expected future traffic, time of day, type and/or number of devices connected to the cable modem, a level of service to which the cable modem is subscribed, an amount of bandwidth that the cable modem has used in the billing period or has left to use in the billing period, or any other suitable considerations.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a low-power client in a wide area network.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a network device:
      receiving an indication from a cable modem termination system (CMTS) that contention opportunities will occur at predetermined intervals;
      subsequent to receiving said indication, transitioning to a power-saving mode in which one or more components of said network device are powered down;
      transitioning out of said power-saving mode during one of said predetermined intervals, and
      periodically while operating in said power-saving mode, powering up one or more of said components, resynchronizing to a signal from said cable modem termination system, and again powering down said one or more of said components.

2. The method of claim 1, wherein said network device is a cable modem, cable set-top-box, or cable gateway.

3. The method of claim 1, wherein said indication is in response to a request sent by said network device.

4. The method of claim 1, wherein said one or more components comprise an amplifier, a mixer, a filter, a data converter, a modulator, and/or a demodulator.

5. The method of claim 1, wherein said one or more components comprise a media access controller.

6. The method of claim 1, wherein said network device is operable to determine said predetermined time intervals based on past traffic statistics and/or patterns.

7. The method of claim 1, wherein said network device does not listen to communications from said CMTS while in said power-saving mode.

8. The method of claim 1, comprising, subsequent to receiving said indication, setting a sleep timer to a value that is determined based on drift of one or more clocks of said network device.

9. A system comprising:
   circuitry for use in a network device comprising a buffer, said circuitry being operable to:
      receive an indication from a cable modem termination system (CMTS) that contention opportunities will occur at predetermined intervals;
      subsequent to said indication, transitioning to a power-saving mode in which one or more portions of said circuitry are powered down;
      transition out of said power-saving mode during one of said intervals, and periodically while operating in said power-saving mode, powering up said one or more portions of said circuitry, resynchronizing to a signal from said cable modem termination system, and again powering down said one or more portions of said circuitry.

10. The system of claim 9, wherein said network device comprises a cable modem, cable set-top-box, or cable gateway.

11. The system of claim 9, wherein said indication is in response to a request sent by said network device.

12. The system of claim 9, wherein said one or more portions of said circuitry comprise an amplifier, a mixer, a filter, a data converter, a modulator, and/or a demodulator.

13. The system of claim 9, wherein said one or more portions of said circuitry comprise a media access controller.

14. The system of claim 9, wherein said network device is operable to determine said predetermined time intervals based on past traffic statistics and/or patterns.

15. The system of claim 9, wherein said network device does not listen to communications from said CMTS while in said power-saving mode.

16. The system of claim 9, wherein said circuitry is operable to, subsequent to reception of said indication, set a sleep timer to a value that is determined based on drift of one or more clocks of said network device.

* * * * *